United States Patent
Wang et al.

(10) Patent No.: US 10,360,079 B2
(45) Date of Patent: Jul. 23, 2019

(54) ARCHITECTURE AND SERVICES SUPPORTING RECONFIGURABLE SYNCHRONIZATION IN A MULTIPROCESSING SYSTEM

(71) Applicant: GM GLOBAL TECHNOLOGY OPERATIONS LLC, Detroit, MI (US)

(72) Inventors: Shige Wang, Northville, MI (US); Stephen G. Lusko, Warren, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 195 days.

(21) Appl. No.: 15/625,051

(22) Filed: Jun. 16, 2017

(65) Prior Publication Data
US 2018/0365080 A1   Dec. 20, 2018

(51) Int. Cl.
G06F 9/46 (2006.01)
G06F 9/52 (2006.01)
G06F 16/27 (2019.01)

(52) U.S. Cl.
CPC .............. *G06F 9/52* (2013.01); *G06F 16/27* (2019.01)

(58) Field of Classification Search
CPC .............................. G06F 9/52; G06F 17/30575
See application file for complete search history.

(56) References Cited

U.S. PATENT DOCUMENTS

| | | | |
|---|---|---|---|
| 5,442,758 A | 8/1995 | Slingwine et al. | |
| 5,623,671 A | 4/1997 | Ando et al. | |
| 5,630,136 A * | 5/1997 | Davidson | G06F 9/526 711/145 |
| 6,725,370 B1 | 4/2004 | Sakakura | |
| 6,742,026 B1 * | 5/2004 | Kraenzel | H04L 67/34 709/203 |
| 8,627,331 B1 | 1/2014 | Grunwald et al. | |
| 2006/0053422 A1 * | 3/2006 | Alikacem | G06F 9/524 718/100 |
| 2016/0006660 A1 * | 1/2016 | Hirose | H04L 47/623 370/235 |
| 2017/0220660 A1 * | 8/2017 | Cao | G06F 17/30578 |
| 2018/0107706 A1 * | 4/2018 | Mishra | G06F 17/30377 |

* cited by examiner

*Primary Examiner* — Camquy Truong
(74) *Attorney, Agent, or Firm* — Lorenz & Kopf, LLP

(57) ABSTRACT

A synchronization method in a multiprocessor system is provided. The method includes providing a plurality of synchronization mechanisms for synchronizing data to be accessed by a plurality of concurrently executable tasks, analyzing design information and runtime information for application software that includes the concurrently executable tasks, identifying, based on the analysis, software architecture patterns for the concurrently executable tasks that access a shared variable, and associating, based on the analysis, each of the software architecture patterns to one or more of the synchronization mechanisms. The method further includes generating synchronization table entries for a synchronization table that identify the shared variable, the software architecture pattern for the concurrently executable tasks that access the shared variable, and the one or more synchronization mechanisms associated with the software architecture pattern and also includes accessing the shared variable using the one or more synchronization mechanisms identified in the synchronization table.

20 Claims, 9 Drawing Sheets

ARCHITECTURE AND SERVICES SUPPORTING RECONFIGURABLE SYNCHRONIZATION IN A MULTIPROCESSING SYSTEM

TECHNICAL FIELD

The technology described in this patent document relates generally to computer systems and more particularly to synchronizing access by concurrently executing tasks to shared data sets in multiprocessor computers systems.

BACKGROUND

Modern vehicles (e.g., automobile, car, light truck, and others) employ various embedded electronic controllers that improve the performance, comfort, safety, etc. of the vehicle. Such controllers include engine controllers, suspension controllers, steering controllers, power train controllers, climate control controllers, infotainment system controllers, chassis system controllers, etc. These controllers may be implemented using multiprocessor systems. The multiprocessors may execute multiple tasks concurrently and some of the concurrently executing tasks may access shared data sets.

Accordingly, it is desirable to provide a system with improved data access synchronization for multiple tasks accessing a shared data set. Furthermore, other desirable features and characteristics of the present invention will become apparent from the subsequent detailed description of the invention and the appended claims, taken in conjunction with the accompanying drawings and the background of the invention.

SUMMARY

A computer system is provided. The computer system includes a plurality of processor cores and non-transient computer readable storage medium embodying programming instructions configurable to perform a method. The method includes providing a plurality of synchronization mechanisms as library services for synchronizing data to be accessed by a plurality of concurrently executable tasks that are executable on one or more processor cores, analyzing design information and runtime information for application software that includes the concurrently executable tasks to form a database of constraints wherein the database of constraints includes the software architecture pattern for the concurrently executing tasks that access a shared variable, associating, based on the analysis, each of the software architecture patterns to one or more of the synchronization mechanisms, and generating synchronization table entries for a synchronization table from the database of constraints wherein the synchronization table identifies the shared variable, the software architecture pattern for the concurrently executable tasks that access the shared variable, and the one or more synchronization mechanisms associated with the software architecture pattern. The method further includes accessing the shared variable using the one or more synchronization mechanisms identified in the synchronization table for accessing the shared variable, wherein accessing the shared variable includes locating the shared variable in the synchronization table, identifying the one or more synchronization mechanisms assigned to the shared variable in the synchronization table, waiting until access is granted to the shared variable, protecting data in the shared variable by invoking the assigned one or more synchronization mechanisms, adjusting task execution per the assigned one or more synchronization mechanisms, and releasing the data protection for the shared variable after access to the shared variable is complete.

A synchronization method in a multiprocessor system is provided. The method includes providing a plurality of synchronization mechanisms as library services for synchronizing data to be accessed by a plurality of concurrently executable tasks that are executable on one or more processor cores, analyzing design information and runtime information for application software that includes the concurrently executable tasks, and identifying, based on the analysis, software architecture patterns for the concurrently executable tasks that access a shared variable. The method further includes associating, based on the analysis, each of the software architecture patterns to one or more of the synchronization mechanisms, generating synchronization table entries for a synchronization table that identify the shared variable, the software architecture pattern for the concurrently executable tasks that access the shared variable, and the one or more synchronization mechanisms associated with the software architecture pattern. The method also includes accessing the shared variable using the one or more synchronization mechanisms identified in the synchronization table for accessing the shared variable.

BRIEF DESCRIPTION OF THE DRAWINGS

Aspects of the present disclosure are best understood from the following detailed description when read with the accompanying figures, wherein like numerals denote like elements.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

Figure 1:
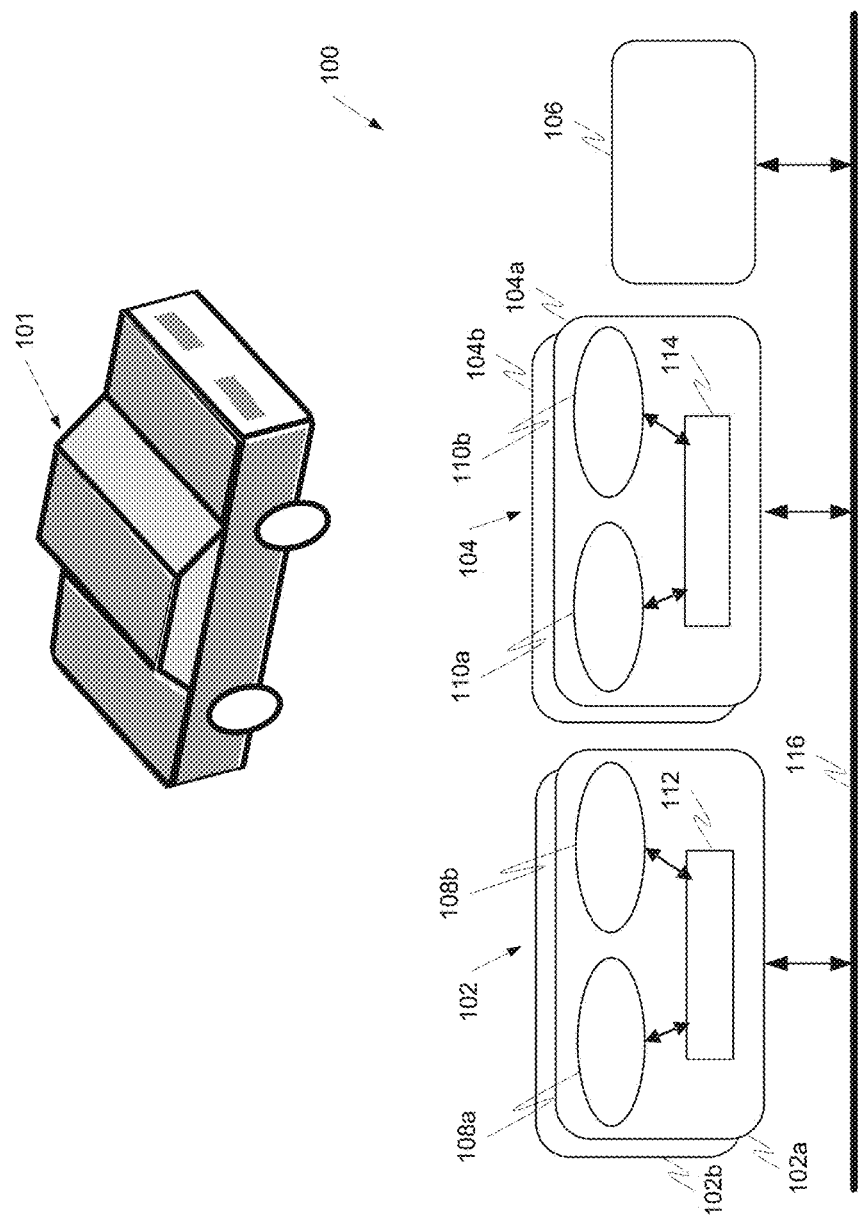
FIG. 1 is a block diagram depicting an example computer system, in accordance with some embodiments.

FIG. 1 is a block diagram depicting an example computer system 100. The example computer system 100 may be used to implement a multiprocessor system such as a multicore vehicle controller used in a vehicle 101 (e.g., automobile, car, light truck, and others). The example computer system 100 includes a first multicore processor 102, a second multicore processor 104, and shared memory 106. Each of the multicore processors 102, 104 contains a plurality of processor cores 102a, 102b, 104a, 104b. Although only two processor cores are shown for each multicore processor 102, 104, in this example, the multicore processors 102, 104 may include many more than two processor cores. In this example, each multicore processor 102, 104 and the shared memory 106 are each on a separate integrated circuit (IC). In another example, the multicore processors 102, 104 may be on the same IC and the shared memory on a different IC. In another example, the multicore processors 102, 104 and the shared memory 106 may be on the same IC as a system on a chip (SOC).

The example computer system may execute application software that comprises a plurality of tasks. Each processor core has access to local memory 112, 114 and can perform one or more of the tasks. In the illustrated example, the processor core 102a can perform tasks 108a, 108b, and the processor core 104a can perform tasks 110a, 110b. In some examples, a task may be jointly performed by multiple processor cores. The processor cores 102, 104 may have local memory 112, 114 and/or shared memory 106 available for access by their tasks for reading and writing.

During execution, a task may access a data set shared with one or more other tasks. The shared data sets may be stored in the local memory 112, 114 and/or shared memory 106. When in local memory, the shared data sets are accessed by tasks performed by the same processor core. When in shared memory 106, the shared data sets may be accessed by tasks performed by the same processor core or by tasks performed by different processor cores.

To achieve a predictable and desired outcome, there may be an intended access order for multiple tasks that access a shared data set. As an example, a first task may need to access data (e.g., write data to a variable) prior to a second task accessing the data (e.g., reading the data from the variable). To ensure that data accesses occur as intended in multithread, multicore, and/or multiprocessor systems, various synchronization mechanisms may be employed. Examples of synchronization mechanisms that may be used include mechanisms involving a lock schedule, a spinlock, a semaphore, a barrier, a mutex, a readers-writer lock, a read-copy-update (RCU), a turnstile, a conditional variable, an adaptive mutex, and a non-waiting synchronization mechanism such as wait-free or lock-free synchronization and others. Some synchronization mechanisms may be more appropriate for a particular software architecture than others.

The apparatus, systems, techniques and articles disclosed herein can allow a computer system to dynamically provide an appropriate synchronization mechanism for data access by multiple tasks accessing a shared data set. The computer system may provide the synchronization mechanisms as a service that can be accessed by a call to an application program interface (API). In response to a call to a synchronization API by application software, a computer system may employ an appropriate synchronization mechanism.

Figure 2:
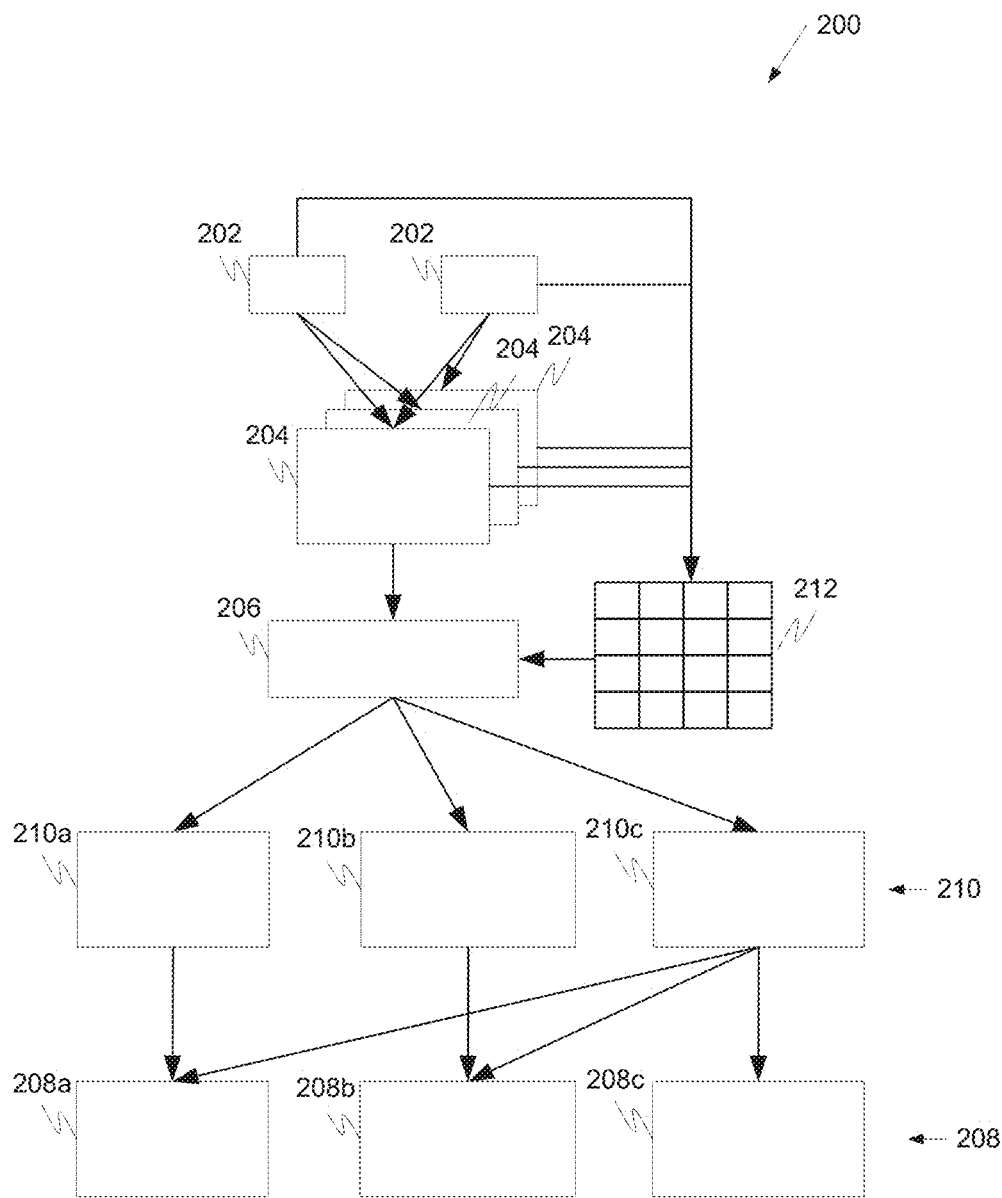
FIG. 2 is a block diagram illustrating an example system that dynamically applies one or more synchronization mechanisms for data access by multiple tasks to a shared data set, in accordance with some embodiments.

FIG. 2 is a block diagram illustrating an example system 200 that dynamically applies one or more appropriate synchronization mechanism(s) for data access by multiple tasks to a shared data set. The applied synchronization mechanism(s) are chosen dynamically by the system 200 based on the software architectural relationship between the tasks that access shared data sets.

The example system 200 includes a plurality of tasks 202 that execute on one or more processor cores that access one or more shared data set(s) 204. The example system 200 includes sync selection 206 that selects an appropriate synchronization mechanism 208 for the shared data sets 204 based on the software architectural relationship 210 between the tasks 202 that access shared data sets.

The example system 200 provides a plurality of synchronization mechanisms 208a, 208b, 208c as library services for synchronizing data accesses by a plurality of concurrently executing tasks 202. The example system 200 associates each of a plurality of software architecture patterns 210a, 210b, 210c to one or more of the synchronization mechanisms 208a, 208b, 208c. The example system 200 identifies the shared data sets, identifies the architectural pattern for the tasks that access the shared data sets, and selects, based on the identified architectural patterns, one or more of the synchronization mechanisms to employ for controlling access to the shared data sets.

In this example, the first synchronization mechanism 208a comprises the use of a lock schedule, the second synchronization mechanism 208b comprises the use of a spin-lock, and the third synchronization mechanism 208c comprises the use of a semaphore and a spin-lock. Other synchronization mechanisms may be employed.

Also, in this example, the first architectural pattern 210a comprises an inter-task, same CPU pattern, i.e., different tasks that access a common data set are performed by the same processor core. The second architectural pattern 210b comprises an intra-task, cross CPU pattern, i.e., different functions in a common task that access a common data set are performed by different processor cores. The third architectural pattern 210c comprises an inter-task, cross CPU pattern, i.e., different tasks that access a common data set are performed by different processor cores. Other architectural patterns may be recognized.

The example system 200 records information regarding the identity of the shared data sets, architectural patterns, and associated synchronization mechanisms in a synchronization (sync) table 212. The sync table 212 is used for sync selection 206 during application software execution. The sync table in this example includes two components: a sync type table and a sync management table. The sync type table records an identifier for the shared data sets and information regarding the software architectural pattern for the tasks that access the shared data set. The sync management table records the identifier for the shared data sets recorded in the sync type table, the synchronization mechanisms to be employed to control access to the shared data sets, and additional management information for use in managing the implementation of the sync mechanisms.

An example sync type table is provided at Table 1 and an example sync management table is provided at Table 2.

TABLE 1

Example Sync Type Table

| Variable group | Runnable (provider) | Scheduled in task | Runnable (consumer) | Scheduled in task | Same core |
|---|---|---|---|---|---|
| (v1, v3) | RA_func1 | T1 | RX_func3 | T2 | False |
|  |  |  | RB_func5 | T3 | True |
| (v5, v7) | RY_func2 | T2 | RB_func2 | T2 | True |
|  |  |  | RX_func1 | T2 | True |

In the example sync type table, a record or row is created for each variable group used to access the shared data set. Each row in this example includes: (i) a variable group identifier for the shared data set; (ii) the identity of the executable function(s) that provide (e.g. write) data to the variable group (a.k.a., the runnable provider); (iii) an identifier for the task(s) that schedule the executable provider function(s); (iv) the identity of the executable function(s) that consume (e.g. read) data from the variable group (a.k.a., the runnable consumer); (v) an identifier for the task(s) that schedule the executable consumer function(s); and (vi) an indication regarding whether the task(s) that schedule the executable provider function(s) and the task(s) that schedule the executable consumer function(s) are performed by the same processor core. This information identifies a software architectural pattern used to access a shared data set. The example table also illustrates that when more than one variable group are accessed by the same functions, the variable groups may be combined in the same record in the sync type table. The example sync type table may be generated from a static dependency analysis of the tasks in application software that share data sets.

In the illustrated example, variable groups v1 and v3 are provided with data by function RA_func1, which is scheduled in task T1, and the data contained therein is consumed by functions RX_func3 and RB_func5, which are respectively scheduled in tasks T2 and T3. In this example, tasks T1 and T2 are performed on different processor cores and tasks T1 and T3 are performed by the same processor core. Also, variable groups v5 and v7 are provided with data by function RY_func2, which is scheduled in task T2, and the data contained therein is consumed by functions RB_func2 and RX_func1, which are both scheduled in task T2. Since the runnable provider and the runnable consumers are scheduled by the same task T2, the same core is identified in this record. The software architectural information contained in this table can be used by the system to determine which synchronization mechanism(s) to employ.

TABLE 2

Example Sync Management Table

| Variable group | Provide count | Consume count | Preempt ceiling |
|---|---|---|---|
| (v1, v3) | (t_A, c1) | (t_A, c2) | 3 |
|  | (t_B, c3) | (t_B, c4) |  |
| (v5, v7) | (t_A, c5) | (t_A, c6) | 2 |
|  | (t_C, c7) | (t_C, c8) |  |

In the example sync management table, a record or row is also created for each variable group used to access the shared data set. Each row in this example table includes: (i) a variable group identifier for the shared data set; (ii) a provide counter that identifies the synchronization mechanism(s) assigned based on the software architecture for employment during access by the runnable provider(s) to the variable group and a synchronization mechanism counter; (iii) a consume counter that identifies the synchronization mechanism(s) assigned based on the software architecture for employment during access by the runnable consumer(s) to the variable group and a synchronization mechanism counter; and (iv) a preempt ceiling that may be used to limit the number of synchronization mechanisms that may be active concurrently for system performance reasons. The sync management table may be generated from a dynamic dependency analysis and throughput analysis of application software, which can identify the synchronization mechanism(s) to be applied based on the software architectural pattern and management constraints for the synchronization mechanisms to ensure an acceptable system performance level.

In the illustrated example, access to variable groups v1 and v3 by runnable providers are synchronized by synchronization mechanism t_A with a counter c1 and synchronization mechanism t_B with a counter c3, and access to variable groups v1 and v3 by runnable consumers are synchronized by synchronization mechanism t_A with a count c2 and synchronization mechanism t_B with a count c4. Also, access to variable groups v5 and v7 by runnable providers are synchronized by synchronization mechanism t_A with a count c5 and synchronization mechanism t_C with a count c7, and access to variable groups v5 and v7 by runnable consumers are synchronized by synchronization mechanism t_A with a count c6 and synchronization mechanism t_C with a count c8.

The sync management table may be used during execution of application software for sync selection 206. The sync management table may be used to dynamically identify the synchronization mechanism to employ. The sync management table may also be used to dynamically limit the number of synchronization mechanisms employed at a given time. In particular, in this example, during application software execution, the sync selection 206 implements one or more of the synchronization mechanisms 208a, 208b, 208c to provide access to a shared data set. The sync selection 206 consults the sync management table portion of the sync table 212 for selecting the appropriate synchronization mechanism to employ and uses the sync management table to manage implementation of the chosen synchronization mechanism(s).

Figure 3:
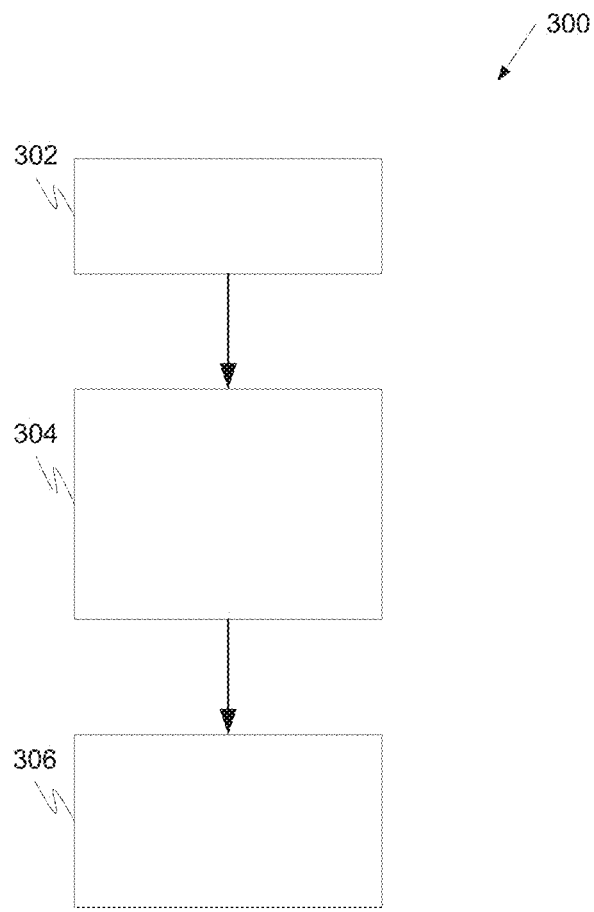
FIG. 3 is a process flow chart depicting an example process used by a system for dynamically selecting synchronization mechanisms for shared data access, in accordance with some embodiments.

FIG. 3 is a process flow chart depicting an example process 300 used by a system for dynamically selecting synchronization mechanisms for shared data access. The example process 300 includes providing synchronization services (operation 302). A computer system can provide a plurality of synchronization mechanisms and select the appropriate synchronization mechanism when called to do so by an API call in application software.

The example process 300 includes generating a custom synchronization table for application software with specific rules on how to handle synchronization (operation 304). The synchronization table can be used for sync selection and can include two components: a sync type table and a sync management table. The sync type table can be generated from a static dependency analysis of the tasks that share data sets in the application software. The analysis may produce information in the sync type table that identifies a software architectural pattern used to access a shared data set. The sync management table can be generated from a dynamic dependency analysis and throughput analysis of the application software. This analysis can identify the synchronization mechanism(s) to apply to the software architectural patterns identified in the sync type table. The sync management table can include tools for managing the utilization of the synchronization mechanisms. The tools may include a preempt ceiling that can be used to limit the number of synchronization mechanisms that may be active at the same time for system performance reasons. The tools may include counters for the synchronization mechanisms for managing the usage of the synchronization mechanisms.

The example process 300 also includes applying the synchronization table during software execution to synchronized shared data (operation 306). During execution of application software, when a task attempts to access or perform operations with the shared dataset, the task makes a call to a synchronization API which causes the invocation of a synchronization mechanism identified in the synchronization table. The tools for managing the utilization of the synchronization mechanisms may also be invoked.

Figure 4:
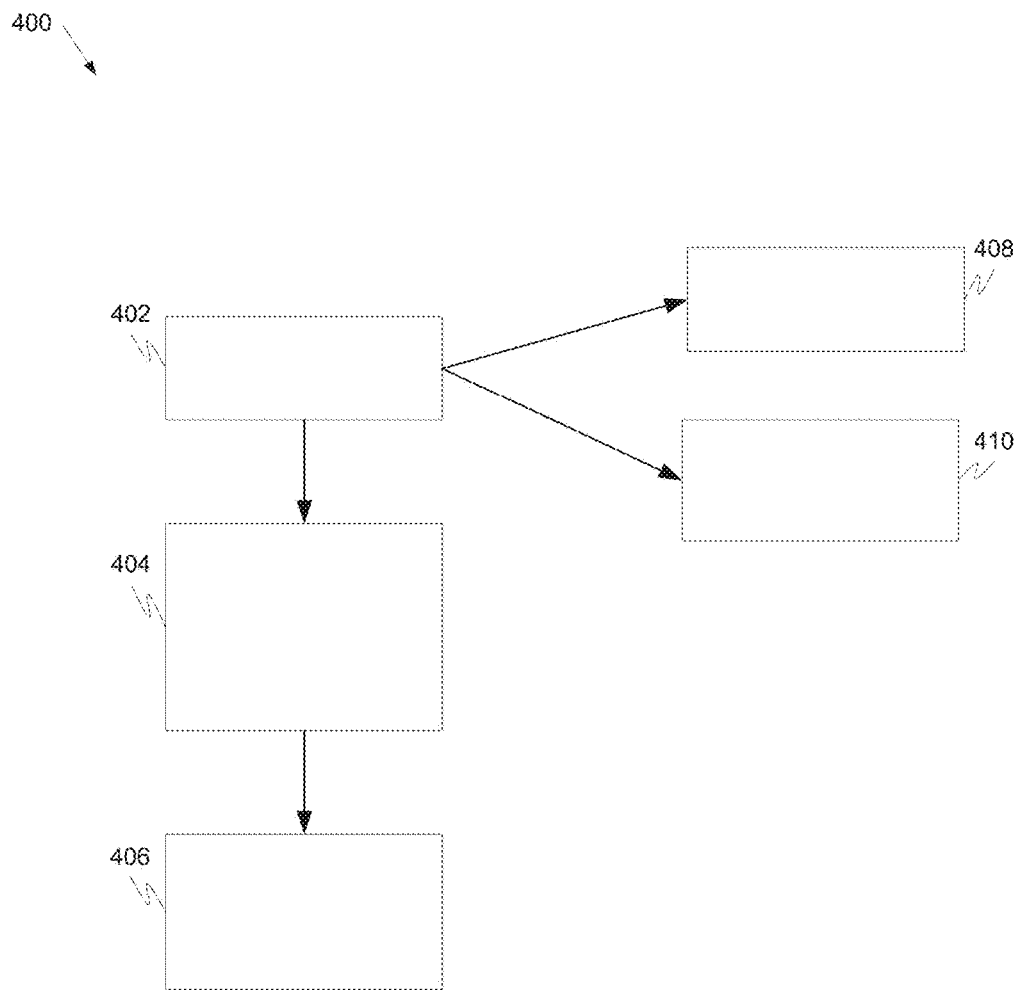
FIG. 4 is a process flow chart depicting an example process used by a system for dynamically selecting synchronization mechanisms for shared data access, in accordance with some embodiments.

FIG. 4 is a process flow chart depicting an example process 400 used by a system for dynamically selecting synchronization mechanisms for shared data access. The example process 400 includes operations similar to the operations of example process 300. The example process includes providing synchronization services (operation 402), generating a custom synchronization table for software code with specific rules on how to handle synchronization (operation 404), and applying the synchronization table during software execution to synchronized shared data (operation 406).

In this example, providing synchronization services includes providing a plurality of synchronization mechanisms (operation 408). Examples of synchronization mechanisms that may be used include mechanisms involving a lock schedule, a spinlock, a semaphore, a barrier, a mutex, a readers-writer lock, a read-copy-update (RCU), a turnstile, a conditional variable, an adaptive mutex, a non-waiting synchronization mechanism such as wait-free or lock-free, and others.

In this example, providing synchronization services also includes providing an API for invoking synchronization (operation 410). Application software can request the use an appropriate data synchronization mechanism by a common API without having to specifically adjust the code for a specific type of synchronization mechanism.

Figure 5:
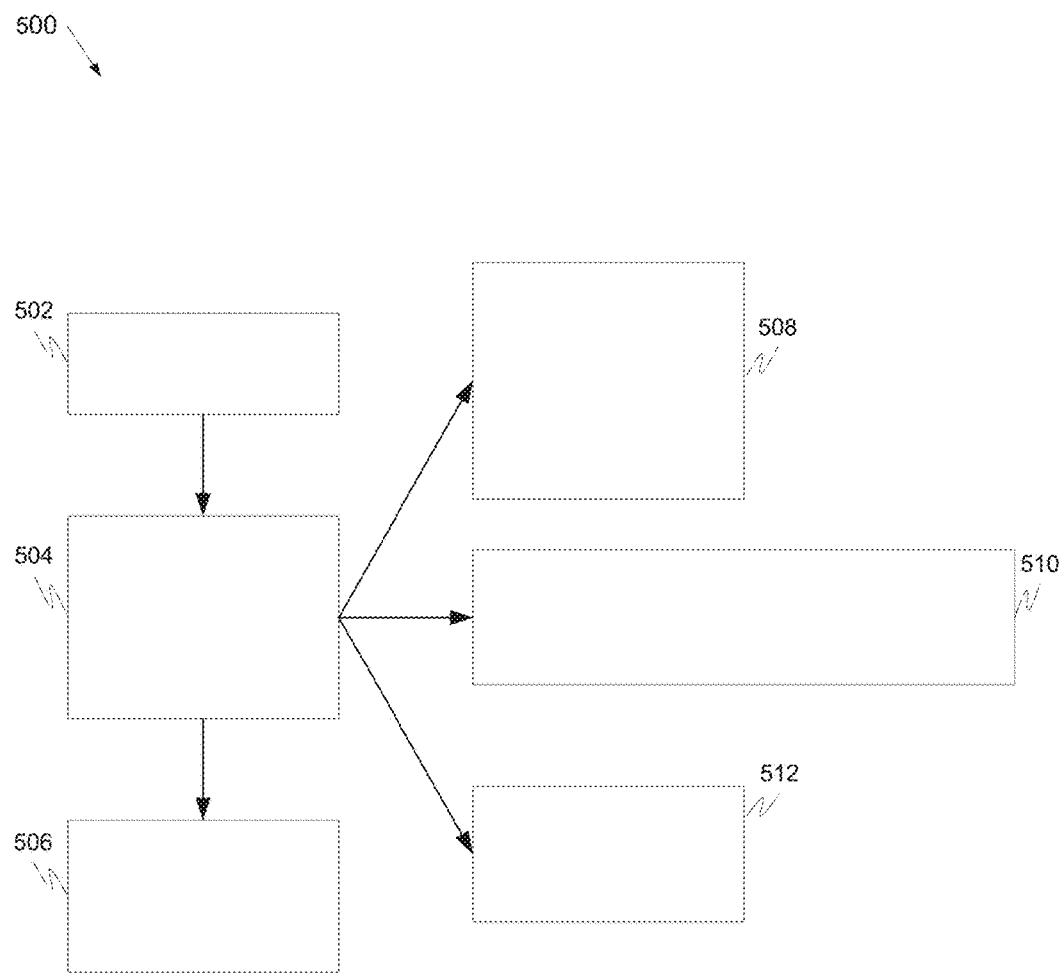
FIG. 5 is a process flow chart depicting an example process used by a system for dynamically selecting synchronization mechanisms for shared data access, in accordance with some embodiments.

FIG. 5 is a process flow chart depicting an example process 500 used by a system for dynamically selecting synchronization mechanisms for shared data access. The example process 500 includes operations similar to the operations of example process 300. The example process includes providing synchronization services (operation 502), generating a custom synchronization table for software code with specific rules on how to handle synchronization (operation 504), and applying the synchronization table during software execution to synchronized shared data (operation 506).

In this example, generating a custom synchronization table for software code with specific rules on how to handle synchronization includes analyzing software to identify shared variables and the software architecture pattern associated with tasks that access the shared variables (operation 508). A static dependency analysis of the tasks that share data sets in the application software can be performed to identify the shared data set and the software architectural pattern used to access the shared data set.

In this example, generating a custom synchronization table also includes performing analysis to identify synchronization mechanisms to be employed to control access to the shared data sets and additional management information for use in managing the implementation of the sync mechanisms (operation 510). A dynamic dependency analysis and throughput analysis of application software can be performed to identify the synchronization mechanism(s) to be applied based on the software architectural pattern and management constraints for the synchronization mechanisms to ensure an acceptable system performance level.

In this example, generating a custom synchronization table additionally includes generating table entries from the results of the analysis (operation 512). The sync table in this example includes two components: a sync type table and a sync management table. The sync type table records an identifier for the shared data sets and information regarding the software architectural pattern for the tasks that access the shared data set. The sync management table records the identifier for the shared data sets recorded in the sync type table, the synchronization mechanisms to be employed to control access to the shared data sets, and additional management information for use in managing the implementation of the sync mechanisms. The sync type table may employ the data structure identified in Table 1 and the sync management table may employ the data structure identified in Table 2.

Figure 6:
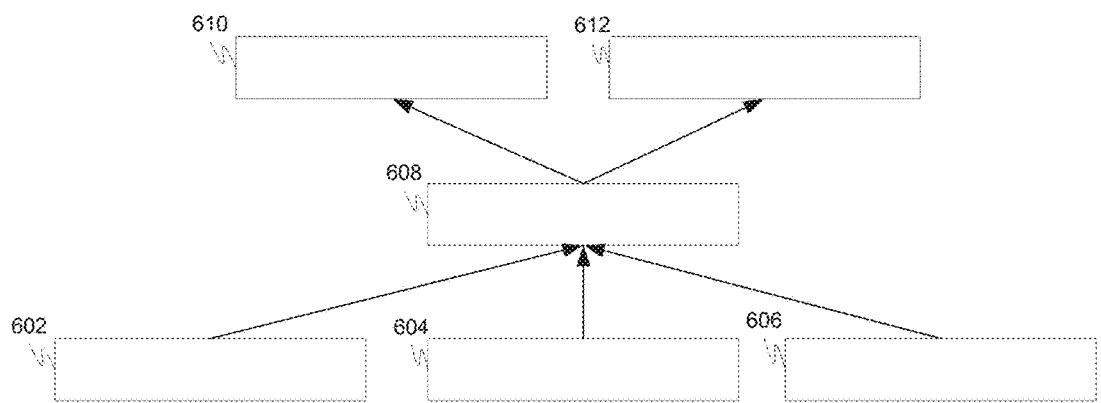
FIG. 6 is a process flow chart depicting an example process for scheduling the generation of the sync table and for generating sync table entries, in accordance with some embodiments.

FIG. 6 is a process flow chart depicting an example process 600 for scheduling the generation of the sync table and for generating sync table entries. The example process includes static dependency analysis 602, dynamic dependency analysis 604, and throughput analysis 606 performed iteratively. Static dependency analysis 602 may involve analyzing design information for application software to identify dependencies found in the source code. Dynamic dependency analysis 604 may involve analyzing runtime information for application software to identify dependencies during runtime. Throughput analysis 606 may involve analyzing application software execution performance. Performance of the static dependency analysis 602, dynamic dependency analysis 604, and throughput analysis 606 can result in the generation of a database of constraints 608. The constraints may be used for scheduling the generation of the sync table (610) and the population of sync table entries (612) into the sync table.

Figure 7:
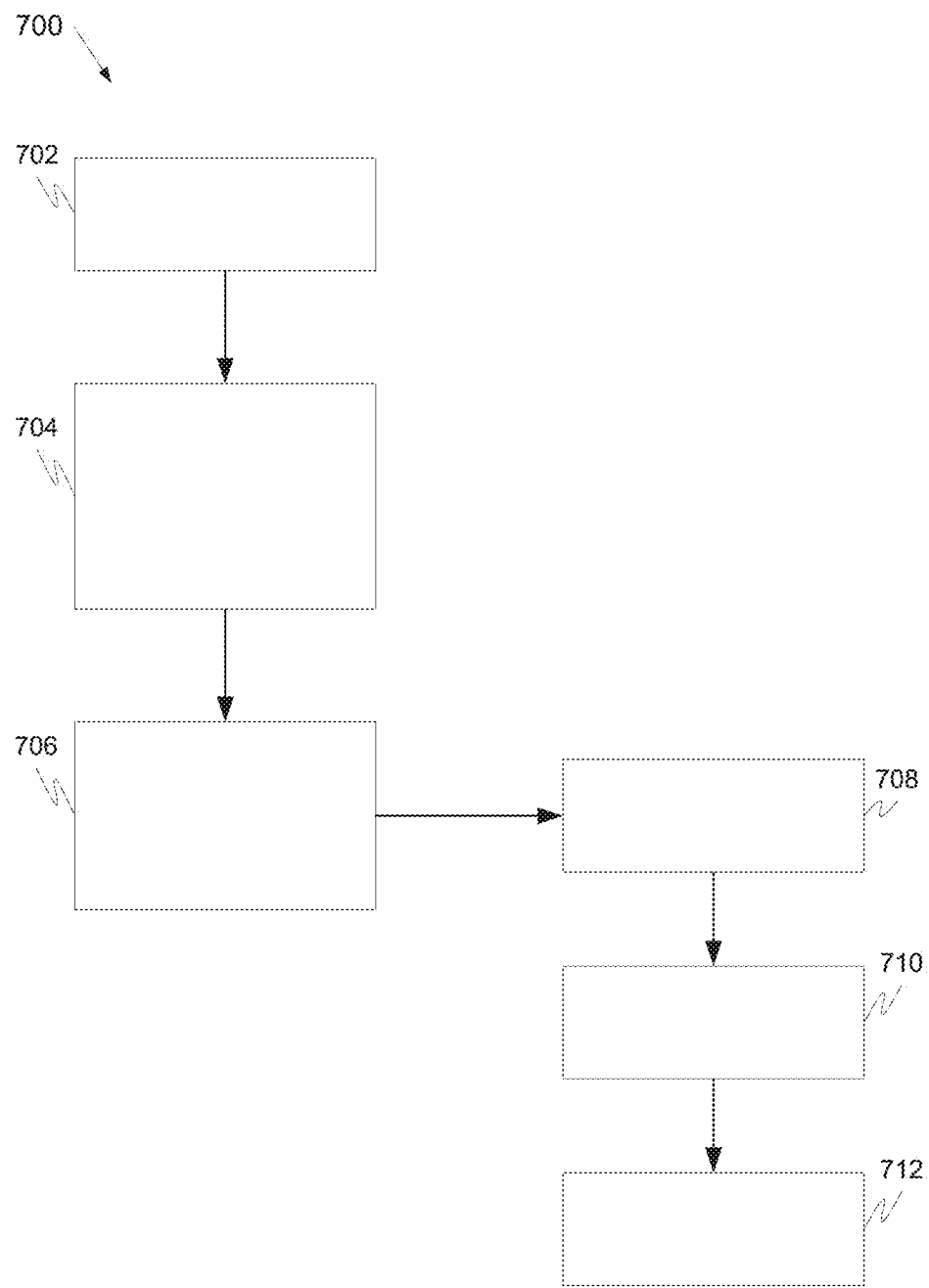
FIG. 7 is a process flow chart depicting an example process used by a system for dynamically selecting synchronization mechanisms for protecting data, in accordance with some embodiments.

FIG. 7 is a process flow chart depicting an example process 700 used by a system for dynamically selecting synchronization mechanisms for protecting data. The example process 700 includes operations that are similar to the operations of example process 300. The example process includes providing synchronization services (operation 702), generating a custom synchronization table for software code with specific rules on how to handle synchronization (operation 704), and applying the synchronization table during software execution to synchronized shared data (operation 706).

In this example, applying the synchronization table during software execution to synchronize shared data includes applying the synchronization mechanism identified in the synchronization table (operation 708). This may involve locating the shared variable in the synchronization table, identifying the one or more synchronization mechanisms assigned to the shared variable in the synchronization table, waiting until access is granted to the shared variable, protecting data in the shared variable by invoking the assigned one or more synchronization mechanisms, and adjusting task execution per the assigned one or more synchronization mechanisms. After applying the synchronization mechanism identified in the synchronization table, the synchronized variable(s) may be accessed (operation 710). After accessing the synchronized variable(s), the synchronization protection is released (operation 712). Releasing the shared variable after access to the shared variable allows other tasks to then access the shared variable.

Figure 8:
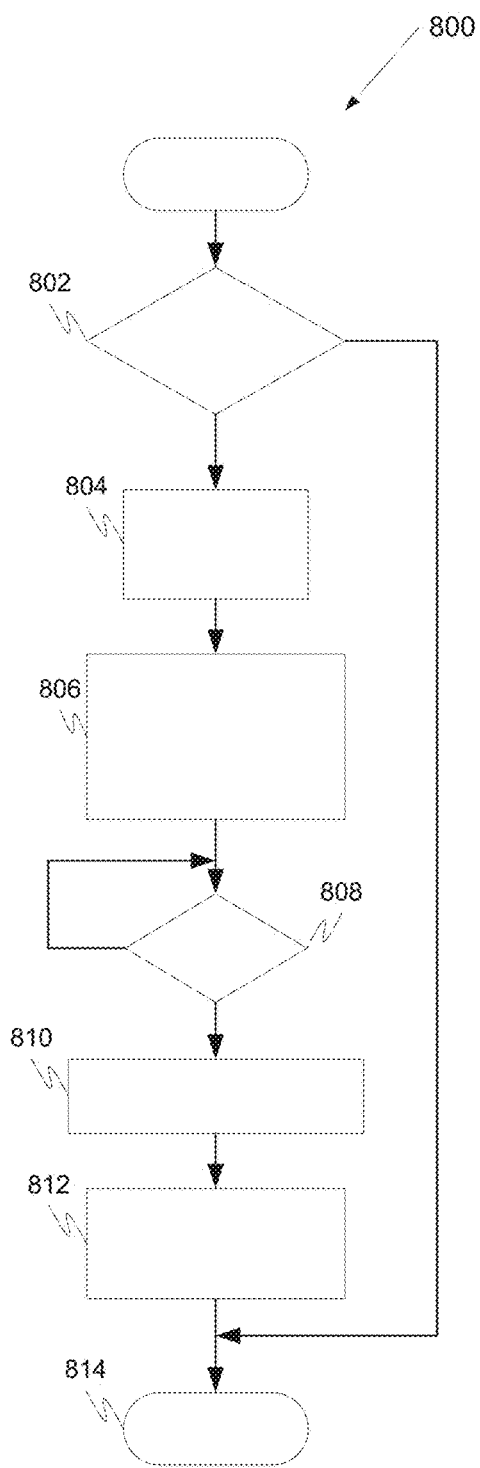
FIG. 8 is a process flow chart depicting an example process for applying synchronization protection, in accordance with some embodiments.

FIG. 8 is a process flow chart depicting an example process 800 for applying synchronization protection. The process 800 includes determining if a variable group to be protected is in the sync type table (decision 802). If the variable group is not in the table (no at decision 802), the process ends. If the variable group is in the table (yes at decision 802), the variable group is located in the sync table type (operation 804). The synchronization mechanism associated with the variable group in the sync management table is identified for employment and any management count associated with the synchronization mechanism is updated (operation 806). After identifying the synchronization mechanism, a check is made to determine if access to variable group has been granted to the calling task (decision 808). If access has not yet been granted (no at decision 808), the process waits until access is granted. If access has been granted (yes at decision 808), data is protected by invoking the determined synchronization mechanism (operation 810). Task execution may be adjusted per the determined synchronization mechanism (operation 812). The process 800 ends after task execution (operation 814).

Figure 9:
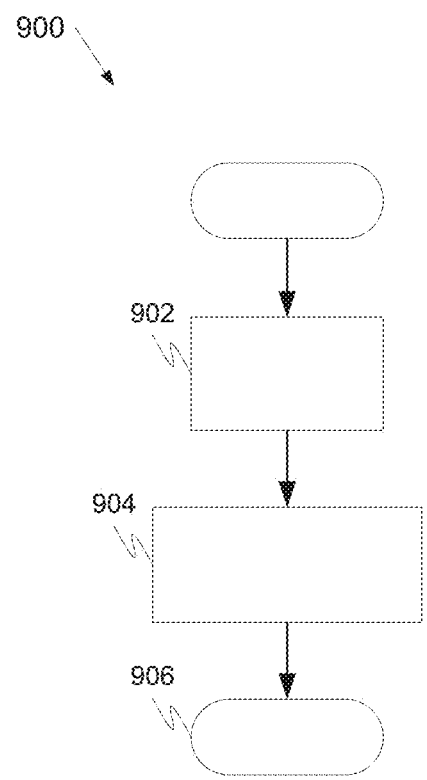
FIG. 9 is a process flow chart depicting an example process for releasing synchronization protection after data access by a task, in accordance with some embodiments.

FIG. 9 is a process flow chart depicting an example process 900 for releasing synchronization protection after data access by a task. The process 900 includes locating the protected variable group in the sync management table (operation 902). The process 900 further includes releasing the variable group and updating the associated count (operation 904). The process 900 ends (operation 906).

Described below is example code that may be embedded in application software to call the API to invoke the synchronization services.

```
Component
    func_A( )
    {
        ... ...
        SyncGetProtect(vgrp1);
        SyncGetProtect(vgrp2);
        localV=compute(vgrp1, vgrp2)
        SyncGetRelease(vgrp2),
        SyncGetRelease(vgrp1);
        ... ...
        SyncPutProtect(vgrp3);
        write(vgrp3, localV);
        SyncPutRelease(vgrp3);
        ... ...
    }
```

The example code includes a SyncGetProtect interface for employing synchronization when a runnable consumer function will access the data set and a SyncPutProtect interface for employing synchronization when a runnable provider function will access the data set. A SyncGetRelease interface is used to release the data set after the runnable consumer function has completed its data access and a SyncPutRelease interface is used to release the data set after the runnable provider function has completed its data access.

Nested protection of variables may be used as illustrated in the example and, if used, the corresponding release interfaces are called in the reversed order in which the protect interfaces were called to prevent deadlock. Multiple protected variable groups are accessed in the same order in which their corresponding protect interfaces are called.

Described herein are apparatus, systems, techniques and articles for dynamically providing an appropriate synchronization mechanism for data access by multiple tasks accessing a shared data set. The apparatus, systems, techniques and articles may provide the synchronization mechanisms as a service that can be accessed by a call to an application program interface (API). In response to a call to a synchronization API by application software, the apparatus, systems, techniques and articles may employ an appropriate synchronization mechanism.

In one embodiment, a synchronization method in a multiprocessor system is provided. The method comprises providing a plurality of synchronization mechanisms as library services for synchronizing data to be accessed by a plurality of concurrently executable tasks that are executable on one or more processor cores, analyzing design information and runtime information for application software that includes the concurrently executable tasks, and identifying, based on the analysis, software architecture patterns for the concurrently executable tasks that access a shared variable. The method further comprises associating, based on the analysis, each of the software architecture patterns to one or more of the synchronization mechanisms, generating synchronization table entries for a synchronization table that identify the shared variable, the software architecture pattern for the concurrently executable tasks that access the shared variable, and the one or more synchronization mechanisms associated with the software architecture pattern. The method also comprises accessing the shared variable using the one or more synchronization mechanisms identified in the synchronization table for accessing the shared variable.

These aspects and other embodiments may include one or more of the following features. Accessing the shared variable may comprise locating the shared variable in the synchronization table, identifying the one or more synchronization mechanisms assigned to the shared variable in the synchronization table, waiting until access is granted to the shared variable, protecting data in the shared variable by invoking the assigned one or more synchronization mechanisms, adjusting task execution per the assigned one or more synchronization mechanisms, and releasing the data protection for the shared variable after access to the shared variable is complete. The synchronization table may comprise a sync type table and a sync management table. The sync type table may record an identifier for the shared variable and information regarding the software architectural pattern for the tasks that access the shared variable. The sync management table may record the identifier for the shared data sets recorded in the sync type table, the synchronization mechanisms to be employed to control access to the shared variables, and additional management information for use in managing the implementation of the sync mechanisms. The sync type table may comprise a data record for each shared variable wherein each record may comprise the identifier for one of the shared variables, the identity of an executable function that provides data to the one shared variable, an identifier for a task that schedules the executable provider function, the identity of the executable function that consumes data from the one shared variable, an identifier for a task that schedules the executable consumer function, and an indication regarding whether the task that schedules the executable provider function and the task that schedules the executable consumer function are performed by the same processor core. The information regarding the software architectural pattern for the tasks that access the shared variable may be determined from a static dependency analysis of the tasks. The sync management table may comprise a data record for each shared variable and each record may comprise the identifier for one of the shared variables, an identifier for the synchronization mechanism assigned to the task that schedules the executable function that provides data to the one shared variable, an identifier for the synchronization mechanism assigned to the task that schedules the executable function that consumes data from the one shared variable, and a preempt ceiling count that may be used to limit the number of synchronization mechanisms that may be active concurrently. The synchronization mechanisms to be employed to control access to the shared variables may be determined from a dynamic dependency analysis and throughput analysis of application software. The design information may comprise the software architecture, the executing tasks, and the accessed data. The runtime information may comprise parallelism, concurrency, and throughput. The method may further comprise providing an application program interface (API) to be called by a software application to invoke a synchronization mechanism during runtime. A call to the API may comprise a protection operation in the software application prior to an operation involving the shared variable and a release operation in the software application after the operation involving the shared variable. The protection operation may comprise a provider protection operation when data is to be written to the shared variable and a consumer protection operation when data is to be read from the shared variable. The release operation corresponding the to the provider protection operation may comprise a provider release operation and the release operation corresponding to the consumer protection operation may comprise a consumer release operation. Accessing the shared variable may further comprise entering a resource count update entry in the synchronization table corresponding to the shared variable. Releasing the shared variable may further comprise releasing the resource count update entry in the synchronization table corresponding to the shared variable. The synchronization mechanisms may be selected from a group comprising a lock schedule, a spinlock, a semaphore, a barrier, a mutex, a readers-writer lock, a read-copy-update (RCU), a turnstile, a conditional variable, an adaptive mutex, and a non-waiting synchronization mechanism such as wait-free or lock-free.

In another embodiment, a computer system is provided. The computer system comprises a plurality of processor cores and non-transient computer readable storage medium embodying programming instructions configurable to perform a method. The method comprises providing a plurality of synchronization mechanisms as library services for synchronizing data to be accessed by a plurality of concurrently executable tasks that are executable on one or more processor cores, analyzing design information and runtime information for application software that includes the concurrently executable tasks to form a database of constraints wherein the database of constraints includes the software architecture pattern for the concurrently executing tasks that access a shared variable, associating, based on the analysis, each of the software architecture patterns to one or more of the synchronization mechanisms, and generating synchronization table entries for a synchronization table from the database of constraints wherein the synchronization table identifies the shared variable, the software architecture pattern for the concurrently executable tasks that access the shared variable, and the one or more synchronization mechanisms associated with the software architecture pattern. The method further comprises accessing the shared variable using the one or more synchronization mechanisms identified in the synchronization table for accessing the shared variable, wherein accessing the shared variable comprises locating the shared variable in the synchronization table, identifying the one or more synchronization mechanisms assigned to the shared variable in the synchronization table, waiting until access is granted to the shared variable, protecting data in the shared variable by invoking the assigned one or more synchronization mechanisms, adjusting task execution per the assigned one or more synchronization mechanisms, and releasing the data protection for the shared variable after access to the shared variable is complete.

These aspects and other embodiments may include one or more of the following features. The synchronization table may comprise a sync type table and a sync management table. The sync type table may record an identifier for the shared variable and information regarding the software architectural pattern for the tasks that access the shared variable. The sync management table may record the identifier for the shared data sets recorded in the sync type table, the synchronization mechanisms to be employed to control access to the shared variables, and additional management information for use in managing the implementation of the sync mechanisms. The sync type table may comprise a data record for each shared variable wherein each record comprises the identifier for one of the shared variables, the identity of an executable function that provides data to the one shared variable, an identifier for a task that schedules the executable provider function, the identity of the executable function that consumes data from the one shared variable, an identifier for a task that schedules the executable consumer function, and an indication regarding whether the task that schedules the executable provider function and the task that schedules the executable consumer function are performed by the same processor core.

The sync management table may comprise a data record for each shared variable wherein each record comprises the identifier for one of the shared variables, an identifier for the synchronization mechanism assigned to the task that schedules the executable function that provides data to the one shared variable, an identifier for the synchronization mechanism assigned to the task that schedules the executable function that consumes data from the one shared variable, and a preempt ceiling count that may be used to limit the number of synchronization mechanisms that may be active concurrently.

In another embodiment, a non-transitory computer readable storage medium embodying programming instructions configurable to cause a multiprocessor system to perform a method is provided. The method comprises providing a plurality of synchronization mechanisms as library services for synchronizing data to be accessed by a plurality of concurrently executable tasks that are executable on one or more processor cores, analyzing design information and runtime information for application software that includes the concurrently executable tasks to form a database of constraints wherein the database of constraints includes the software architecture pattern for the concurrently executing tasks that access a shared variable, associating, based on the analysis, each of the software architecture patterns to one or more of the synchronization mechanisms, and generating synchronization table entries for a synchronization table from the database of constraints wherein the synchronization table identifies the shared variable, the software architecture pattern for the concurrently executable tasks that access the shared variable, and the one or more synchronization mechanisms associated with the software architecture pattern. The method further comprises accessing the shared variable using the one or more synchronization mechanisms identified in the synchronization table for accessing the shared variable, wherein accessing the shared variable comprises locating the shared variable in the synchronization table, identifying the one or more synchronization mechanisms assigned to the shared variable in the synchronization table, waiting until access is granted to the shared variable, protecting data in the shared variable by invoking the assigned one or more synchronization mechanisms, adjusting task execution per the assigned one or more synchronization mechanisms, and releasing the data protection for the shared variable after access to the shared variable is complete.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A synchronization method in a multiprocessor system, the method comprising:
   providing a plurality of synchronization mechanisms as library services for synchronizing data to be accessed by a plurality of concurrently executable tasks that are executable on one or more processor cores;
   analyzing design information and runtime information for application software that includes the concurrently executable tasks;
   identifying, based on the analysis, software architecture patterns for the concurrently executable tasks that access a shared variable;
   associating, based on the analysis, each of the software architecture patterns to one or more of the synchronization mechanisms;
   generating synchronization table entries for a synchronization table that identify the shared variable, the software architecture pattern for the concurrently executable tasks that access the shared variable, and the one or more synchronization mechanisms associated with the software architecture pattern; and
   accessing the shared variable using the one or more synchronization mechanisms identified in the synchronization table for accessing the shared variable, wherein accessing the shared variable comprises:
      locating the shared variable in the synchronization table;
      identifying the one or more synchronization mechanisms assigned to the shared variable in the synchronization table;
      waiting until access is granted to the shared variable;
      protecting data in the shared variable by invoking the assigned one or more synchronization mechanisms; and
      adjusting task execution per the assigned one or more synchronization mechanisms; and
   releasing the data protection for the shared variable after access to the shared variable is complete.

2. The method of claim 1 wherein:
   the synchronization table comprises a sync type table and a sync management table;
   the sync type table records an identifier for the shared variable and information regarding the software architectural pattern for the tasks that access the shared variable; and
   the sync management table records the identifier for the shared data sets recorded in the sync type table, the synchronization mechanisms to be employed to control access to the shared variables, and additional management information for use in managing the implementation of the sync mechanisms.

3. The method of claim 2 wherein the sync type table comprises a data record for each shared variable and wherein each record comprises:
   the identifier for one of the shared variables;
   the identity of an executable function that provides data to the one shared variable;
   an identifier for a task that schedules the executable provider function;
   the identity of the executable function that consumes data from the one shared variable;
   an identifier for a task that schedules the executable consumer function; and
   an indication regarding whether the task that schedules the executable provider function and the task that schedules the executable consumer function are performed by the same processor core.

4. The method of claim 2 wherein the information regarding the software architectural pattern for the tasks that access the shared variable is determined from a static dependency analysis of the tasks.

5. The method of claim 2 wherein the sync management table comprises a data record for each shared variable and wherein each record comprises:
   the identifier for one of the shared variables;
   an identifier for the synchronization mechanism assigned to the task that schedules the executable function that provides data to the one shared variable;
   an identifier for the synchronization mechanism assigned to the task that schedules the executable function that consumes data from the one shared variable; and
   a preempt ceiling count that may be used to limit the number of synchronization mechanisms that may be active concurrently.

6. The method of claim 2 wherein the synchronization mechanisms to be employed to control access to the shared variables is determined from a dynamic dependency analysis and throughput analysis of application software.

7. The method of claim 6 wherein:
   the protection operation comprises a provider protection operation when data is to be written to the shared variable and a consumer protection operation when data is to be read from the shared variable; and
   the release operation corresponding the to the provider protection operation comprises a provider release operation and the release operation corresponding to the consumer protection operation comprises a consumer release operation.

8. The method of claim 1 wherein the design information comprises the software architecture, the executing tasks, and the accessed data.

9. The method of claim 1 wherein the runtime information comprises parallelism, concurrency, and throughput.

10. The method of claim 9 wherein releasing the shared variable further comprises releasing the resource count update entry in the synchronization table corresponding to the shared variable.

11. The method of claim 1 further comprising:
providing an application program interface (API) to be called by a software application to invoke a synchronization mechanism during runtime.

12. The method of claim 11 wherein a call to the API comprises:
a protection operation in the software application prior to an operation involving the shared variable; and
a release operation in the software application after the operation involving the shared variable.

13. The method of claim 1 wherein accessing the shared variable further comprises entering a resource count update entry in the synchronization table corresponding to the shared variable.

14. The method of claim 1 wherein the synchronization mechanisms are selected from a group comprising a lock schedule, a spinlock, a semaphore, a barrier, a mutex, a readers-writer lock, a read-copy-update (RCU), a turnstile, a conditional variable, an adaptive mutex, and a non-waiting synchronization mechanism such as wait-free or lock-free.

15. A computer system comprising:
a plurality of processor cores; and
non-transient computer readable storage medium embodying programming instructions configurable to perform a method, the method comprising:
providing a plurality of synchronization mechanisms as library services for synchronizing data to be accessed by a plurality of concurrently executable tasks that are executable on one or more processor cores;
analyzing design information and runtime information for application software that includes the concurrently executable tasks to form a database of constraints, the database of constraints including the software architecture pattern for the concurrently executing tasks that access a shared variable;
associating, based on the analysis, each of the software architecture patterns to one or more of the synchronization mechanisms;
generating synchronization table entries for a synchronization table from the database of constraints, the synchronization table identifying the shared variable, the software architecture pattern for the concurrently executable tasks that access the shared variable, and the one or more synchronization mechanisms associated with the software architecture pattern;
accessing the shared variable using the one or more synchronization mechanisms identified in the synchronization table for accessing the shared variable, wherein accessing the shared variable comprises:
locating the shared variable in the synchronization table;
identifying the one or more synchronization mechanisms assigned to the shared variable in the synchronization table;
waiting until access is granted to the shared variable;
protecting data in the shared variable by invoking the assigned one or more synchronization mechanisms; and
adjusting task execution per the assigned one or more synchronization mechanisms; and
releasing the data protection for the shared variable after access to the shared variable is complete.

16. The computer system of claim 15, wherein:
the synchronization table comprises a sync type table and a sync management table;
the sync type table records an identifier for the shared variable and information regarding the software architectural pattern for the tasks that access the shared variable; and
the sync management table records the identifier for the shared data sets recorded in the sync type table, the synchronization mechanisms to be employed to control access to the shared variables, and additional management information for use in managing the implementation of the sync mechanisms.

17. The computer system of claim 16, wherein the sync type table comprises a data record for each shared variable and wherein each record comprises:
the identifier for one of the shared variables;
the identity of an executable function that provides data to the one shared variable;
an identifier for a task that schedules the executable provider function;
the identity of the executable function that consumes data from the one shared variable;
an identifier for a task that schedules the executable consumer function; and
an indication regarding whether the task that schedules the executable provider function and the task that schedules the executable consumer function are performed by the same processor core.

18. The computer system of claim 16, wherein the sync management table comprises a data record for each shared variable and wherein each record comprises:
the identifier for one of the shared variables;
an identifier for the synchronization mechanism assigned to the task that schedules the executable function that provides data to the one shared variable;
an identifier for the synchronization mechanism assigned to the task that schedules the executable function that consumes data from the one shared variable; and
a preempt ceiling count that may be used to limit the number of synchronization mechanisms that may be active concurrently.

19. A non-transitory computer readable storage medium embodying programming instructions configurable to cause a multiprocessor system to perform a method, the method comprising:
providing a plurality of synchronization mechanisms as library services for synchronizing data to be accessed by a plurality of concurrently executable tasks that are executable on one or more processor cores;
analyzing design information and runtime information for application software that includes the concurrently executable tasks to form a database of constraints, the database of constraints including the software architecture pattern for the concurrently executing tasks that access a shared variable;
associating, based on the analysis, each of the software architecture patterns to one or more of the synchronization mechanisms;
generating synchronization table entries for a synchronization table from the database of constraints, the synchronization table identifying the shared variable, the software architecture pattern for the concurrently executable tasks that access the shared variable, and the one or more synchronization mechanisms associated with the software architecture pattern;
accessing the shared variable using the one or more synchronization mechanisms identified in the synchronization table for accessing the shared variable, wherein accessing the shared variable comprises:

locating the shared variable in the synchronization table;

identifying the one or more synchronization mechanisms assigned to the shared variable in the synchronization table;

waiting until access is granted to the shared variable;

protecting data in the shared variable by invoking the assigned one or more synchronization mechanisms; and adjusting task execution per the assigned one or more synchronization mechanisms; and releasing the data protection for the shared variable after access to the shared variable is complete.

20. The non-transitory computer readable storage medium of claim 19, wherein:

the synchronization table comprises a sync type table and a sync management table;

the sync type table records an identifier for the shared variable and information regarding the software architectural pattern for the tasks that access the shared variable; and the sync management table records the identifier for the shared data sets recorded in the sync type table, the synchronization mechanisms to be employed to control access to the shared variables, and additional management information for use in managing the implementation of the sync mechanisms.

\* \* \* \* \*